US 8,526,450 B2

(12) United States Patent
Cha

(10) Patent No.: US 8,526,450 B2
(45) Date of Patent: *Sep. 3, 2013

(54) HOST DEVICE INTERFACE WITH A POINT OF DEPLOYMENT (POD) AND A METHOD OF PROCESSING BROADCAST DATA

(75) Inventor: Sang Hoon Cha, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 107 days.

This patent is subject to a terminal disclaimer.

(21) Appl. No.: 13/302,865

(22) Filed: Nov. 22, 2011

(65) Prior Publication Data

US 2012/0063457 A1     Mar. 15, 2012

Related U.S. Application Data

(63) Continuation of application No. 12/821,910, filed on Jun. 23, 2010, now Pat. No. 8,085,798, which is a continuation of application No. 12/216,179, filed on Jun. 30, 2008, now Pat. No. 7,746,878.

(60) Provisional application No. 60/952,839, filed on Jul. 30, 2007.

(30) Foreign Application Priority Data

Jul. 5, 2007 (KR) .................. 10-2007-0067645

(51) Int. Cl.
*H04L 12/28* (2006.01)

(52) U.S. Cl.
USPC ........................ 370/401; 370/392; 370/352

(58) Field of Classification Search
USPC ............ 370/392, 401, 352; 725/110, 151
See application file for complete search history.

(56) References Cited

U.S. PATENT DOCUMENTS

| 7,298,846 | B2 * | 11/2007 | Bacon et al. .................. 380/212 |
|---|---|---|---|
| 7,397,819 | B2 | 7/2008 | Kobayashi |
| 7,746,878 | B2 | 6/2010 | Cha |
| 7,860,109 | B2 | 12/2010 | Cha |
| 2004/0019913 | A1 | 1/2004 | Wong et al. |
| 2004/0109452 | A1 | 6/2004 | Takihiro et al. |
| 2005/0122976 | A1 | 6/2005 | Poli et al. |
| 2005/0138669 | A1 | 6/2005 | Baran |
| 2006/0130110 | A1 | 6/2006 | Cho et al. |
| 2009/0034531 | A1 | 2/2009 | Cha et al. |

(Continued)

OTHER PUBLICATIONS

"OpenCable Multi-Stream CableCARD Interface Specification, OC-SP-MC-IF-101-030905, Cablelabs, 20030905", 2003.

(Continued)

*Primary Examiner* — Gary Mui
(74) *Attorney, Agent, or Firm* — McKenna Long & Aldridge LLP

(57) ABSTRACT

A host device interfacing with a point of deployment (POD) and a method of processing broadcast data are disclosed. Herein, an Internet Protocol (IP) physical interface unit receives an Ethernet frame including broadcast data; and a routing engine transforms the Ethernet frame to an IP packet when a destination address included in the Ethernet frame matches with an address of a pod and routs the transformed IP packet to an extended channel connected to the POD. Accordingly, it is possible to protect contents using a conditional access provided by the existing cable card and process broadcast data received on all types of transmission protocols including an IP protocol over a wired/wireless network using a channel provided for connection between the existing cable card and the host device.

14 Claims, 10 Drawing Sheets

(56) References Cited

U.S. PATENT DOCUMENTS

| | | |
|---|---|---|
| 2009/0059927 A1 | 3/2009 | Cha |
| 2009/0080430 A1 | 3/2009 | Cha |
| 2010/0242075 A1 | 9/2010 | Vimpari et al. |

OTHER PUBLICATIONS

Anonymous: "Host-Pod Interfance Standard" American National Standard: ANSI/SCTE 28 2007, [Online] (2007), XP002517003, Retrieved from the Internet: URL:http://www.scte.org/documents/standard_s/approved/ANSISCTE282007.pdf [retrieved on Feb. 26, 2009].

Anonymous: "DOCSIS Set-Top Gateway (DSG) Interface Specification", Data-Over-Cable Service Interface Specifications: CM-SP-DSG-I10-070223 [Online] (2007), XP002517004, Retrieved from the Internet: URL:http://www.cablelaabs.com/specifications/archives/CM-SP-DSG-110-070223.pdf [retrieved on Feb. 26, 2009].

Anonymous: "Open Cable Host Device 2.0 Core Functional Requirements", Opencable Specifications: OC-SP-HOST2.0-CFR-I14-070615 [Online] (2007), XP002517005, Retrieved from the Internet: URL:http://www.cablelabs.com/specifictions/OC-SP-HOST2.0-CFR-I14-070615.pdf [Retrieved on Feb. 26, 2009].

Anonymous: "Multi-Stream CableCARD Interface", Opencable Specifications: OC-SP-MC-IF-001-050331, [Online] (2005), pp. 1-147, XP002507410, [Retrieved from the Internet: URL:http://www.opencable.com/downloads/specs/OC-SP-MC-IF-C01-050331.pdf [Retrieved on Dec. 22, 2008].

\* cited by examiner

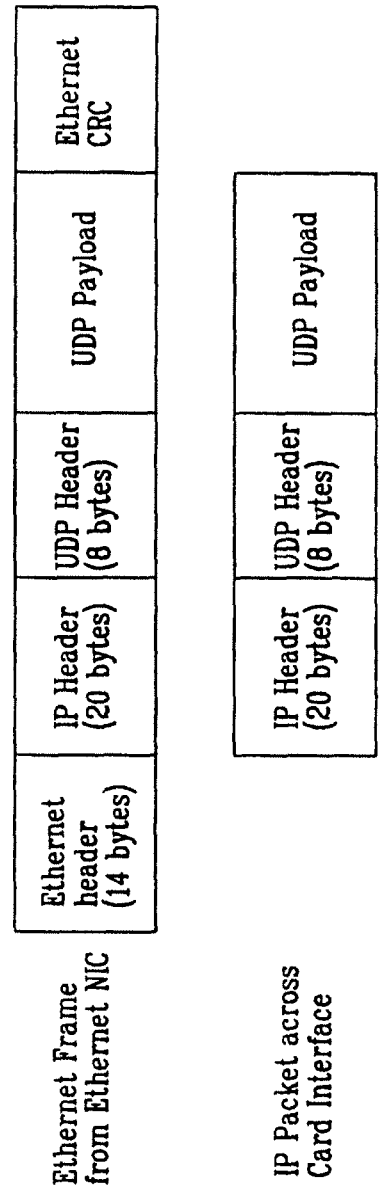

HOST DEVICE INTERFACE WITH A POINT OF DEPLOYMENT (POD) AND A METHOD OF PROCESSING BROADCAST DATA

This application is a continuation of U.S. patent application Ser. No. 12/821,910, filed on Jun. 23, 2010 now U.S. Pat. No. 8,085,798, now allowed, which is a continuation of U.S. patent application Ser. No. 12/216,179, filed on Jun. 30, 2008 now U.S. Pat. No. 7,746,878, now patented, which claims the benefit of Korean Patent Application No. 10-2007-0067645, filed on Jul. 5, 2007 which claims the benefit of U.S. Provisional Application No. 60/952,839, filed on Jul. 30, 2007, all of which are hereby incorporated by reference.

BACKGROUND OF THE INVENTION

1. Field of the Invention

The present invention relates to a host device and a method of processing broadcast data, and more particularly, to a host device for processing broadcast data transmitted on the basis of an Internet protocol (IP) and a method of processing broadcast data.

2. Discussion of the Related Art

Existing television (TV) services have been provided in such a manner that contents produced by broadcasting companies are transmitted through radio transmission media, such as terrestrial waves, cables or satellites, and a viewer watches the transmitted contents through a TV receiver capable of receiving the transmitted contents via the respective transmission media.

However, as digital TV technologies based on digital broadcasting are developed and are commercially available, breaking from existing analog broadcasting, various contents, such as real-time broadcasts, Contents on Demand (CoD), games and news, can be provided to a viewer using the Internet network connected to each home, besides the existing transmission media.

An example of the provision of contents using the Internet network may include an Internet Protocol TV (IPTV). The IPTV indicates a broadcast receiver for receiving various types of information services, moving-image contents and broadcasts using an Internet network and displaying them to a user. The Internet network can be implemented on the basis of various types of networks such as optical cable networks, coaxial cable networks, fiber-to-the-home (FTTH), telephone networks and wireless networks.

The service using the Internet network additionally has bidirectionality and enables a viewer to watch a desired program at his/her convenient time, unlike general terrestrial broadcasting.

SUMMARY OF THE INVENTION

Accordingly, the present invention is directed to a host device interfacing with a point of deployment (POD) and a method of processing broadcast data that substantially obviate one or more problems due to limitations and disadvantages of the related art.

An object of the present invention is to provide a host device interfacing with a POD using an Internet protocol (IP), which is capable of protecting transmitted contents using a conditional access provided by the existing cable card, and a method of processing broadcast data.

Another object of the present invention is to provide a host device capable of processing broadcast data received on the basis of an Ethernet protocol, and a method of processing broadcast data.

Another object of the present invention is to provide a host device capable of processing broadcast data received on the basis of an Ethernet protocol using a channel provided for connection between the existing cable card and a host device.

Another object of the present invention is to provide a host device capable of transforming the format of received broadcast data in order to transmit the broadcast data received on all types of transmission protocols including an IP protocol, over a wired/wireless network, by a channel provided for connection between the existing cable card and a host device, and a method of processing broadcast data.

Another object of the present invention is to provide a host device capable of receiving broadcast data from a Multimedia over Coax Alliance (MoCA) and a method of processing broadcast data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a host device interfacing with a point of deployment (POD) includes an Internet Protocol (IP) physical interface unit for receiving an Ethernet frame including broadcast data, and a routing engine for transforming the Ethernet frame to an IP packet when a destination information included in the Ethernet frame matches with an address of a pod and routing the transformed IP packet to an extended channel connected to the pod. Herein, the broadcast data is at least one of a command data, a control data, a conditional access data, a DRM data and a MPEG section data and the extended channel may be an IP flow. And the destination information is any of a MAC address, an IP address and a port number.

Also, the IP physical interface unit may receive the Ethernet frame through MoCA (Multimedia over Coax Alliance).

Also, the Ethernet frame may include an Ethernet header, an IP packet and an Ethernet CRC. Herein, the routing engine may remove the Ethernet header and the Ethernet CRC from the Ethernet frame to transform the Ethernet frame to the IP packet.

Also, the host device further includes a Broadband Interface unit for receiving broadcast data through a cable, a Demodulator for demodulating the received broadcast data, and a multiplexer for multiplexing the demodulated broadcast data and outputting the multiplexed broadcast data to MPEG data flow connected to the POD. Also, the host device further includes an IP to TS Decapsulator for receiving the transformed IP packet and extracting a MPEG-2 TS packet carried within the received IP packet and outputting the extracted MPEG-2 TS packet to the multiplexer. Herein, the multiplexer multiplexes the MPEG-2 TS packet and outputs the multiplexed MPEG-2 TS packet to the MPEG data flow.

In another aspect of the present invention, a method of processing broadcast data includes receiving an Ethernet frame including broadcast data through a network modem, and transforming the Ethernet frame to an IP packet when a destination information included in the Ethernet frame matches with an address of a pod and routing the transformed Ethernet frame to an extended channel to the pod. Herein, the broadcast data is at least one of a command data, a control data, a conditional access data, a DRM data and a MPEG section data. And the destination information is any of a MAC address, an IP address and a Port number. And the network modem may be a Multimedia over Coax Alliance (MoCA). And the extended channel may be an IP flow. Also, the Ethernet frame includes an Ethernet header, an IP packet and an Ethernet CRC. Herein, transforming the Ethernet frame to an IP packet includes removing the Ethernet header and the Ethernet CRC from the Ethernet.

It is to be understood that both the foregoing general description and the following detailed description of the present invention are exemplary and explanatory and are intended to provide further explanation of the invention as claimed.

According to the present invention, it is possible to protect contents using a conditional access provided by the existing cable card. Thus, a service provider can protect the contents and stably request payment from a service user using the conditional access.

Since broadcast data received on the basis of an Ethernet protocol is processed so as to interface with an open cable card, the service user can watch a desired service of a provider by changing or extending the function of the existing cable card by as small as possible.

Since the broadcast data received on all types of transmission protocols including an IP protocol over a wired/wireless network using a channel provided for connection between the existing cable card and a host device is processed, it is possible to process the broadcast data received on the basis of the Ethernet protocol by changing or extending the function of the existing cable card by as small as possible.

Since the broadcast data is received from a Multimedia over Coax Alliance (MoCA), it is possible to implement seamless IP-based connectivity over the coaxial network and to use IP over Coax.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a schematic view showing an Ethernet frame packet and an IP packet to which the Ethernet frame packet is transformed in order to pass through an IP_U flow, according to an embodiment of the present invention.

DETAILED DESCRIPTION OF THE INVENTION

Figure 1:
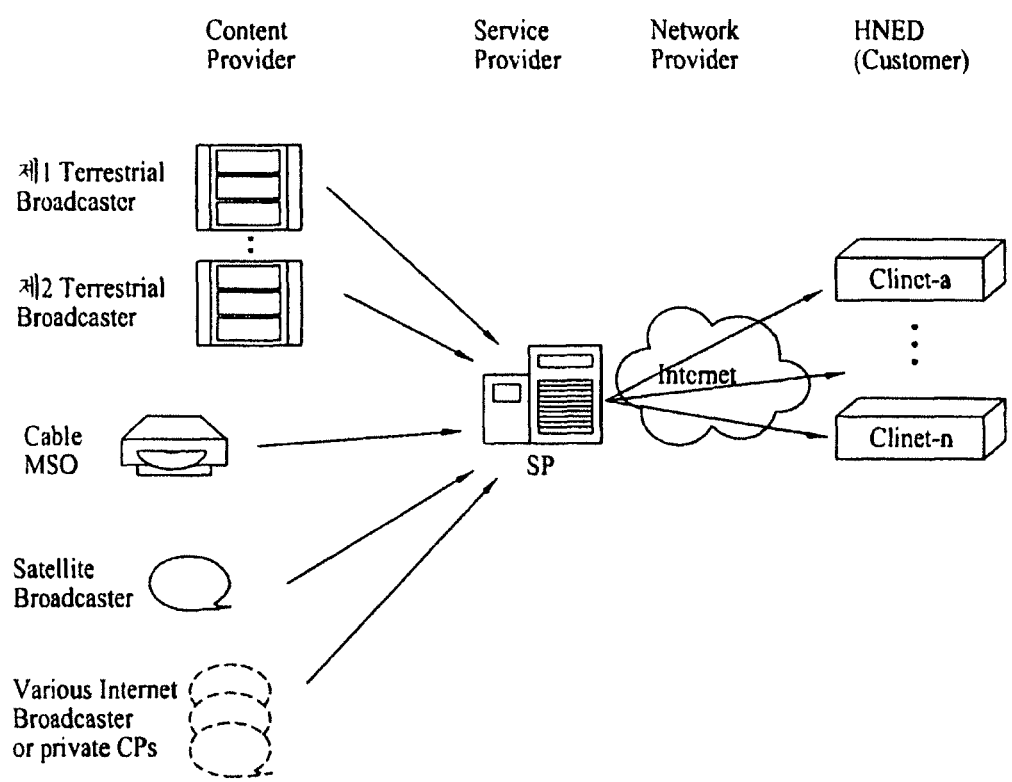
FIG. 1 is a schematic view showing an IPTV system according to an embodiment of the present invention.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

A broadcast receiver and a method of processing broadcast data according to the present invention will be described in detail with reference to the accompanying drawings.

An Internet protocol TV (IPTV) system which is an example of a system capable of providing various types of contents using an Internet network may be largely divided into a server, a network and a broadcast receiver (client).

The server of the IPTV system may include servers having various functions, such as a service discovery and selection server, a streaming server, a content guide information server, a customer information server, and a payment information server.

Among these servers, the streaming server transmits stored Moving Picture Experts Group (MPEG)-2 or MPEG-4 encoding moving-image data to the broadcast receiver via a network. As a transmission protocol, a real-time transport protocol (RTP) or a RTP control protocol (RTCP) may be used.

In the case where a real-time streaming protocol (RTSP) is used, the reproduction of a moving-image stream can be controlled by a network trick play function such as Pause, Replay, Stop or the like to some extent.

The content guide information server provides information on provided various contents. The content guide information includes a variety of information on the contents as information corresponding to electronic program guide (EPG) information. The content guide information server stores content guide information data and provides the stored data to the broadcast receiver.

Among the servers, the service discovery and selection server provides access information of servers for providing various types of content services such as broadcasts, Contents on Demand (CoD) or games and reproduction information to the broadcast receiver.

A network system includes an Internet-based network and gateways. As the Internet-based network, various types of networks based on the IP, such as optical cable networks, coaxial cable networks, fiber-to-the-home (FTTH), telephone networks and wireless networks, may be used. The gateways may generally perform data delivery, multicast group management using a protocol such as an Internet Group Management Protocol (IGMP) and Quality of Service (QoS) management.

The IPTV indicates a broadcast receiver capable of receiving data transmitted via the Internet network and providing the data to a user. The broadcast receiver may include an IPTV settop, a homenet gateway and an IPTV embedded TV.

A hybrid IPTV system can provide various types of contents of the Internet as well as various types of existing broadcast contents. That is, besides various types of broadcast contents such as terrestrial broadcasting, cable broadcasting, satellite broadcasting or private broadcasting, various Internet image contents or data contents other than images can be provided to the user. These contents may be provided in real time or on demand.

FIG. 1 is a schematic view showing an IPTV system according to an embodiment of the present invention.

From the viewpoint of a content service provider, the IPTV system may be divided into a content provider (CP), a service provider (SP), a network provider (NP) and a user.

The CP manufactures and provides various types of contents. The CP may include a terrestrial broadcaster, a cable system operator (SO) or a cable multiple system operator (MSO), a satellite broadcaster and an Internet broadcaster.

The SP packages contents provided by the CP to a service and provides the service. For example, the SP of FIG. 1 packages a first terrestrial broadcast, a second terrestrial broadcast, a cable MSO broadcast, a satellite broadcast, various Internet broadcasts to the service and provides the service to the user.

As means for protecting the contents transmitted in the IPTV system, conditional access or content protection may be used. As an example of the conditional access or the content protection, a cable card or a downloadable conditional access system (DCAS) may be used.

The use of the security card or the DCAS is selected by the SP for providing the IPTV service. In the case where the security card or the DCAS is used in the broadcast receiver, the SP communicating with the broadcast receiver should use that system.

Figure 2:
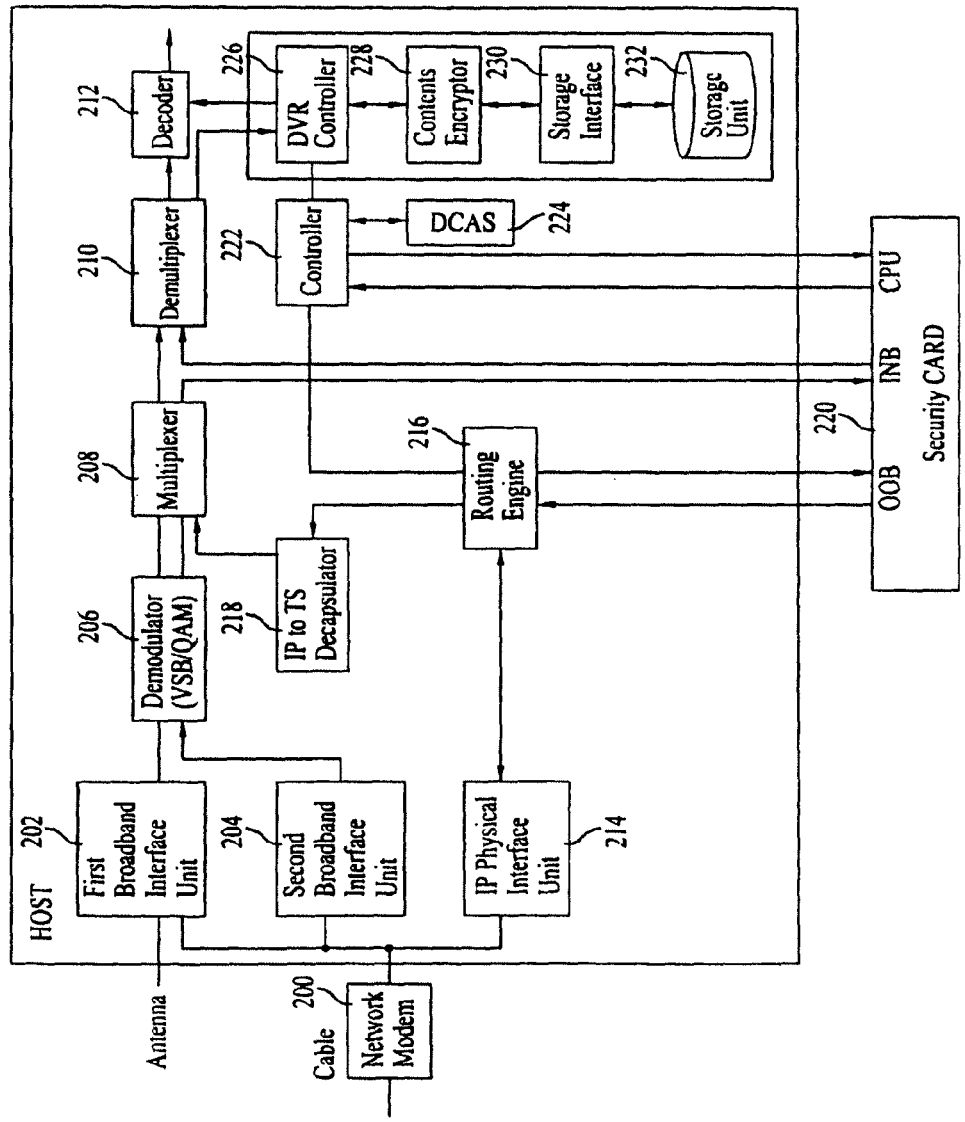
FIG. 2 is a schematic block diagram showing a broadcast receiver using a security card according to an embodiment of the present invention.

FIG. 2 is a schematic block diagram showing a broadcast receiver using the security card according to an embodiment of the present invention.

The broadcast receiver of FIG. 2 can receive all of an IPTV service based on the IP, a cable broadcast, a terrestrial broadcast and a satellite broadcast. The broadcast receiver of FIG. 2 may receive only the IPTV service or cable broadcasting according to the implementation examples. The security card of FIG. 2 may be called other terms according to the implementation examples.

The broadcast receiver of FIG. 2 is largely divided into a host device and a security card. The host device includes a first broadband interface unit 202, a second broadband interface unit 204, a demodulator 206, a multiplexer 208, a demultiplexer 210, a decoder 212, an IP physical interface unit 214, a routing engine 216, an IP to transport packet (TP) decapsulator 218, a controller 222, a downloadable CAS (DCAS) 224, a digital video recorder (DVR) controller 226, a content encryptor 228, a storage interface 230, and a storage unit 232. The security card 220 may be a single stream card capable of processing only one stream and a multi stream card capable of simultaneously processing a plurality of streams. For example, the security card 220 may be implemented by a cable card or a smart card.

The broadcast receiver is an open cable type receiver in which the security card including a conditional access system (CAS) can be detached from a main body. The security card is also called a point of deployment (POD) module, which is inserted into or detached from a slot of the main body of the broadcast receiver. The main body into which the security card is inserted is also called a host device. That is, a combination of the security card and the host device is called the broadcast receiver.

The host device included in the broadcast receiver of FIG. 2 is one example implemented by a multi stream host device capable of simultaneously processing a plurality of streams. When a host device is implemented by a single stream host device capable of processing only one stream, it is bypassed for multiplexer 208 and the demultiplexer 210 of the host device of FIG. 2 to generate a CableCard MPEG Packet (CMP) by appending a Packet Header to a MPEG transport packet and multiplex the CMP and demultiplex the multiplexed CMP. But, though a host device is implemented a single stream host device, the other operations that the present invention disclose are performed identically.

The Implementation Examples

A network modem 200 connects an external network and the broadcast receiver. For example, the broadcast receiver may be connected to the external network using a data over cable service interface specification (DOCSIS) modem, a wireless repeater connected to a wireless Internet network, or a wired repeater connected to a wired Internet network, such as a wired Asymmetric Digital Subscriber Line (ADSL) repeater. The example of the connection between the broadcast receiver and the external network is only exemplary and may vary depending on how the broadcast receiver is connected to the external network.

Figure 3:
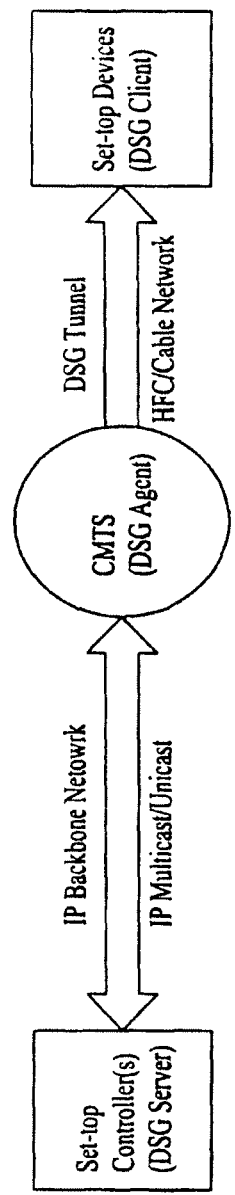
FIG. 3 is a view showing the connection between the broadcast receiver and an external network using a cable modem termination system (CMTS) over a data over cable service interface specifications (DOCSIS) network using the CMTS and a DOCSIS modem.

FIG. 3 is a view showing the connection between the broadcast receiver and the external network using the DOCSIS modem according to the present invention.

In the case where the network modem 200 is implemented by the DOCSIS modem, the broadcast receiver according to the present invention may be connected to a DOCSIS network. That is, the network modem 200 may build a cable modem termination system (CMTS) (DSG agent) and a DSG tunnel for delivering a data broadcast received from a set-top controller (DSG server) via the DOCSIS network and receive broadcast data via the built DSG tunnel. Here, the DOCSIS network may be implemented by an IP backbone network and support IP multicast/unicast.

However, in order to support the IP multicast/unicast via the DOCSIS network, a packet received from the CMTS (DSG agent) should be transformed to a DSG packet and the DSC packet should be transmitted. Accordingly, the broadcast receiver cannot be directly connected to the external IP network so as to receive the broadcast data.

In order to solve these problems, the network modem 200 may provide a function for directly connecting the broadcast receiver to the external IP network. For example, the network modem 200 may be implemented by a Multimedia over Coax Alliance (MoCA). In the case where the network modem 200 is implemented by the MoCA, the IP-based network may be established and connected over a coaxial cable network. That is, in the case where the network modem 200 is implemented by the MoCA, the DOCSIS may not be used, the DOCSIS modem does not need to be used, and the CMTS connected to the DOCSIS modem over the network does not need to be used. In addition, the DSG tunnel established between the DOCSIS modem and the CMTS does not need to be used. Accordingly, since seamless IP-based connectivity may be implemented over the coaxial network, the broadcast receiver according to the present invention can use IP over Coax and thus provide a rapid stable broadcast service to the user.

The first broadband interface unit 202 tunes to only a specific channel frequency of terrestrial audio/video (A/V) broadcasting transmitted via an antenna or cable A/V broadcasting transmitted in-band via a cable connected to the network modem 200, and outputs the tuned signal to the demodulator 206.

At this time, since the terrestrial broadcast and the cable broadcast are transmitted by different transmission methods, they are demodulated by different demodulation methods in the demodulator 206. For example, while the terrestrial A/V broadcast is modulated by a vestigial sideband modulation (VSB) method, the cable A/V broadcast is modulated by a quadrature amplitude modulation (QAM) method. Therefore, if the channel frequency tuned by the first broadband interface unit 202 is the terrestrial broadcast, the demodulator 206 demodulates the terrestrial broadcast by the VSB method and if the channel frequency tuned by the first broadband interface unit 202 is the cable broadcast, demodulates the cable broadcast by the QAM method.

The second broadband interface unit 204 tunes to only a specific channel frequency of cable A/V broadcast transmitted in-band via the cable connected to the network modem 200, and outputs the tuned signal to the demodulator 206.

The first broadband interface unit 202 and the second broadband interface unit 204 may tune the signals of different channels and transmit the signals to the demodulator 206. Alternatively, the first broadband interface unit 202 and the second broadband interface unit 204 may tune different A/V streams of the same channel and transmit the signals to the demodulator 206. For example, the first broadband interface unit 202 may tune a stream of a main picture and the second broadband interface unit 204 may tune a stream of a picture in picture (PIP). In the case where a digital video signal is stored in a digital video recorder (DVR), the video signal may be watched and recorded using the first broadband interface unit 202 and the second broadband interface unit 204.

The demodulator 206 demodulates the received signal and transmits the demodulated signal to the multiplexer 208. The multiplexer 208 may multiplex the signals output from the demodulator 206 and the IP to TP decapsulator 218 and output the multiplexed signal. For example, the main video signal which is tuned by the first broadband interface unit 202 and is demodulated and the PIP video signal which is tuned by the second broadband interface unit 204 and is demodulated are multiplexed and the multiplexed signal is output. The video signals of different channels may be multiplexed, or the demodulated signal and the signal output from the IP to TP decapsulator 218 may be multiplexed, according to the implementation examples.

If the signal output from the multiplexer 208 is terrestrial broadcast data, the signal is output to the demultiplexer 210 and, if the signal output from the demultiplexer 208 is the cable broadcast data or the IPTV broadcast data, the signal is output to the demultiplexer 210 via the security card 220 mounted in the slot. The security card 220 includes the CAS in order to prevent higher value-added broadcasting contents from being copied and permit conditional access, which is also called the POS module.

That is, if the received broadcast data is scrambled, the security card 220 descrambles the broadcast data and outputs the descrambled data to the demultiplexer 210. If the security card 220 is not mounted, the A/V broadcast data output from the multiplexer 208 is directly output to the demultiplexer 210. In this case, the scrambled A/V broadcast data cannot be descrambled and thus cannot be normally watched.

The demultiplexer 210 routes the A/V broadcast data output from the multiplexer 208 and the A/V broadcast data output from the security card 220 to be output to the decoder 212 or the DVR controller 226. The decoder 212 restores the compressed A/V signal to an original signal via a video/audio decoding algorithm and outputs the restored signal.

The DVR controller 226, the content encryptor 228, the storage interface 230 and the storage unit 232 serve to store the received digital data or reproduce the stored data. The DVR controller 226 controls MPEG TS routed by the demultiplexer 210 to be stored or controls video data, audio data and system data selected from stored data to be reproduced, under the control of the controller 222. The content encryptor 228 encrypts data to be stored and outputs the encrypted data or decrypts the encrypted data and outputs the decrypted data. The encryptor 228 may not be used according to the implementation examples.

The storage interface 230 performs data input/output interface with the storage unit 232, and the storage unit 232 stores the received data.

The DCAS 224 may download and store the CASs from a transmission server and perform a CAS function according to a proper CAS of the stored CASs. The controller 222 controls data processing of the host device and the interface between the host device and the security card.

The IP physical interface unit 214 receives an Ethernet frame packet transmitted to a specific IP address in the signal received via the network modem 200 and transmits the Ethernet frame packet to the routing engine 216. Alternatively, the IP physical interface unit receives bi-directional communication data (e.g., pay program application, receiver status information, user input or the like) from the routing engine and transmits the data to the external network via the network modem 200. The specific IP address may be the IP address of the host device or the IP address of the security card.

In the broadcast receiver of FIG. 2, IPTV broadcast data according to the IP protocol, a Video On Demand (VOD) signal or an Out Of Band (OOB) message signal may be received via the IP physical interface unit 214. In the existing cable broadcast, an OOB message such as System Information (SI), an Emergency Alert System (EAS), an eXtended Application Information Table (XAIT), CAS information, or a variety of card control information is received using a DOCSIS Settop gateway (DSG) method or an OOB method.

In the broadcast receiver of FIG. 2, the DOCSIS modem or the OOB tuner may be included in the host device such that the OOB message is received. For example, the OOB message may be received using one of the IP method and the OOB method or using one of the IP method, the DSG method and the OOB method.

In the case where the OOB message is received using one of the IP method and the OOB method, the broadcast receiver of FIG. 2 further requires an OOB tuner or demodulator. In the case where the OOB message is received using one of the IP method, the DSG method and the OOB method, the broadcast receiver of FIG. 2 further requires the DOCSIS modem, the OOB tuner, a switching unit for selecting one of the DSG method and the OOB method, and a demodulator for transmitting the data to the headend according to the method.

In the case where all the IP method, the DSG method and the OOB method can be used or in the case where both the IP method and the OOB method can be used except for the DSG method, the transmitter selects one of the above-described methods and transmits information on the selected method to the security card 220. The security card 220 informs the host device of the operating method according to the information on the method selected by the transmitter. In this case, backward compatibility can be solved.

In the broadcast receiver of FIG. 2, for convenience of description, the case where the OOB message is received via the IP physical interface unit 214 using the IP, instead of the DSG method using the DOCSIS modem or the OOB method using the OOB tuner, will be described. In this case, the transmitter should packetize the OOB message using the IP and transmit the OOB message. In the VOD or IPTV broadcast, the message such as the CAS information may be received in the form of a packet such as a VOD packet or an IPTV broadcast packet.

The OOB message is only exemplary, and other necessary information may be added or unnecessary information of the above-described information may be excluded according to the implementation examples.

The routing engine 216 routes the received packet to a destination of the packet using a TCP/IP protocol-based network stack. The TCP/IP network 216 supports both a TCP/IP protocol and a user datagram protocol (UDP)/IP protocol.

The routing engine 216 routes the received VOD signal or the IPTV broadcast data to the IP to TP decapsulator 218. The IP to TP decapsulator 218 parses the received MPEG or MPEG-2 TS packet and outputs the parsed packet to the multiplexer 208. The process after the multiplexer 208 is described above. Since the MPEG-2 broadcast data is used in the above example, the TP packet is received and parsed. However, in the case where the broadcast data using other standard is received, other units may be used instead of the TP packet unit. Accordingly, the scope of the present invention is not limited to the terms used in the implementation examples.

The routing engine 216 transmits the packet, of which the destination is the security card 220, to the security card 220. The OOB message which is one of the packets of which the destination is the security card 220 is routed by the routing engine 216 and transmitted to the security card 220. In the case where the OOB message is routed to the security card 220, the data can be transmitted to the security card 220 using a second layer routing method, a third layer routing method, or a fourth layer routing method.

If the second layer routing method is used, the message is routed using a media access control (MAC) address system of the destination included in the header of the received Ethernet frame. If the third layer routing method is used, the message is routed using an IP address system of the destination included in the IP header of the received Ethernet frame. The use of the second layer routing method or the third layer routing method may vary according to implementation examples. If the fourth layer routing method is used, the message is routed using a port number included in the UDP header of the received Ethernet frame. If the received Ethernet frame includes the TCP header, the message is routed using a port number included in the TCP header of the received Ethernet frame. The use of the second layer routing method, the third layer routing method or the fourth layer routing method may vary according to implementation examples. That is, the second layer routing method, the third layer routing method or the fourth layer routing method may be used according to implementation examples.

A data channel, an extended channel and an in-band channel exist between the security card and the host device. The data channel is set such that a control signal is exchanged between the host device and the security card, and the extended channel is set such that actual data is exchanged. The data channel and the extended channel are CPU interfaces which are defined such that data is exchanged between the host device and the security card.

That is, the security card communicates with a transmitter, analyzes a command received from the transmitter, and performs an operation instructed by the transmitter while communicating with the host device via the data channel and the extended channel or sends contents input by the user to the transmitter.

At this time, in order to transmit the data via the extended channel, first, a transmission line corresponding to the data type defined between the security card and the host device should be set. This is called a flow. For example, in order to transmit MPEG section data, an MPEG section flow is set between the security card and the host device and then the MPEG section data is actually transmitted via the flow. The extended channel may include a DSG flow, an IP flow and an MPEG section flow. The IP flow may include at least one of an IP unicast (IP_U) flow and an IP multicast (IP_M) flow.

The in-band channel is set between the host device and the security card in order to transmit an MPEG-2 transport packet containing audio, video and data and corresponds to an MPEG interface or an in-band MPEG-TS interface. The MPEG data flow is set as the transmission line for transmitting the data via the in-band channel.

Figure 4:
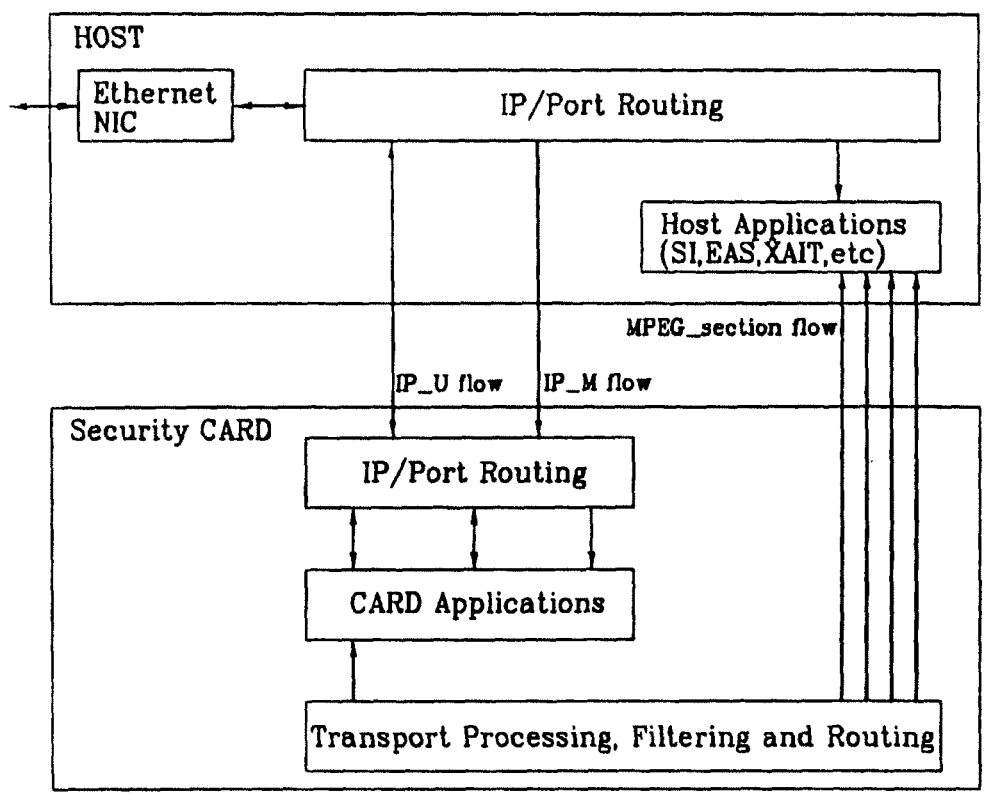
FIG. 4 is a view showing a flow and a process on an extended channel between a security card and a host device according to an embodiment of the present invention.

FIG. 4 is a view showing the flow and process on the extended channel between the security card and the host device according to an embodiment of the present invention. The flow on the extended channel of FIG. 4 includes at least one IP unicast (IP_U) flow, at least one IP multicast (IP_M) and at most six MPEG section flows. If the embedded DOCSIS modem is included in the host device of FIG. 2, the DSG flow for transmitting the OOB message received via the DOCSIS modem to the security card is further included.

In FIG. 4, the OOB message packet received via the IP physical interface unit of the host device may be transmitted to the security card via the IP address based routing method. The routing to the IP address of the destination is performed by the routing engine 216. The packet used in each application of the host device is routed to the corresponding application. For example, as the application in the host device, a multicasting (MC) application or a navigation (NAV) application may be used.

In the case where the host device of FIG. 4 transmits the data to the security card, the IP_U flow or the IP_M flow may be used and, in the case where the security card transmits the data to the host device, the IP_U flow may be used. The data received by the security card via the flow is routed again and transmitted to the corresponding application in the security card. For example, as the application in the security card, a CA application, an MC application or a RPT (IPPV (impulse pay per view) report back function) application may be used.

In the data received by the security card, MPEG section data other than data which is used only in the security card is filtered and routed to each application of the host device via the MPEG section flow. For example, as the MPEG section data, SI, EAS or XAIT data may be used. The security card extracts the MPEG section data from the received data, configures MPEG section data segments to complete MPEG section data, and transmits the MPEG section data to the host device via the MPEG section flow.

The IP_U flow transmits the data, which is received by the host device using the unicast method, to the security card and has a bi-directionality between the host device and the security card. The IP_M flow transmits the data, which is received by the host device using the multicast method, to the security card. The IP_M flow has a uni-directionality of the card direction.

Figure 5A:
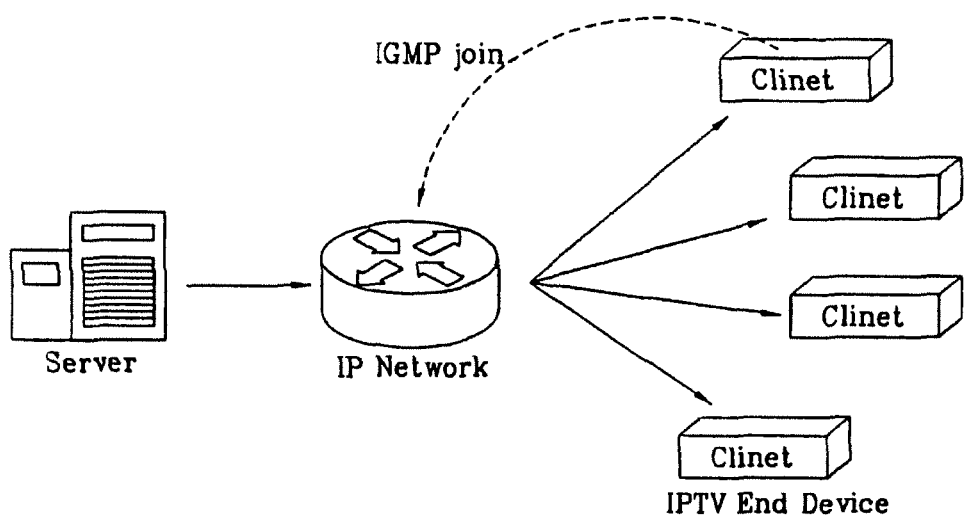
FIG. 5A is a schematic view showing a multicast method.
Figure 5B:
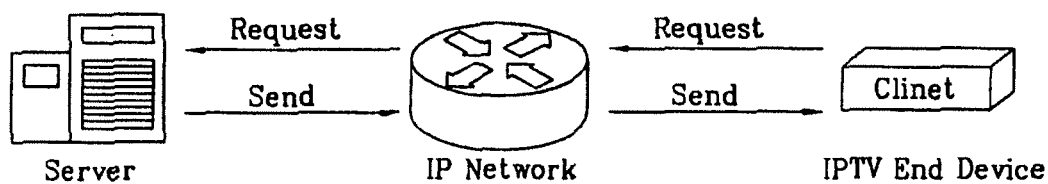
FIG. 5B is a schematic view showing a unicast method.

FIGS. 5A and 5B are schematic views showing the multicast method and the unicast method. In the unicast method, data is transmitted between one transmitter and one receiver in one-to-one correspondence. For example, in the unicast method, if the receiver requests the data to the server, the server transmits the data to the broadcasting receiver according to the request. In the multicast method, data is transmitted to a plurality of receivers in a specific group. For example, the server can simultaneously transmit the data to the plurality of receivers which are previously registered. For the multicast registration, an Internet group management protocol (IGMP) may be used.

In the case where the OOB message is received by transmitting/receiving the data between the security card and the transmitter headend, the unicast method may be used. In the case where the OOB message is transmitted/received using the unicast method, the OOB message received by the host device may be transmitted to the security card via the IP_U flow.

Figure 6A:
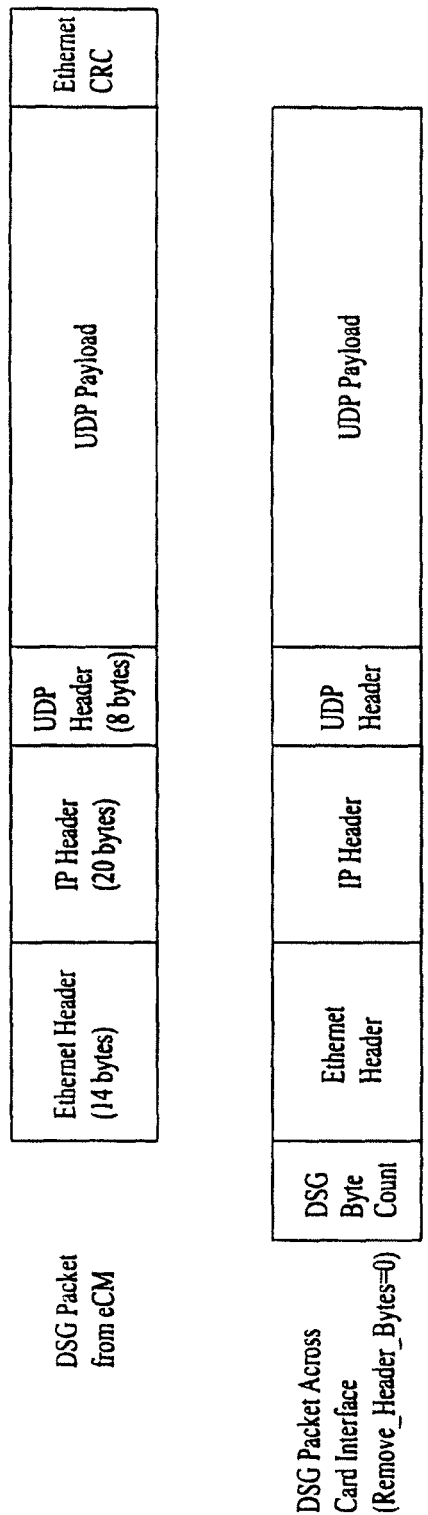
FIGS. 6A to 6C are schematic views showing an Ethernet frame packet and a DSG packet to which the Ethernet frame packet is transformed.
Figure 6B:
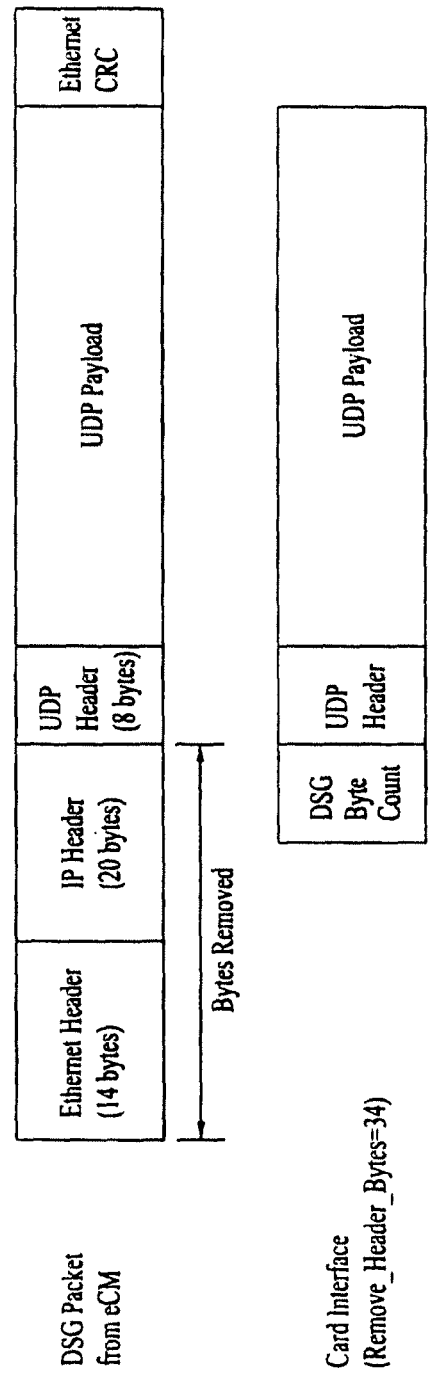
Figure 6C:
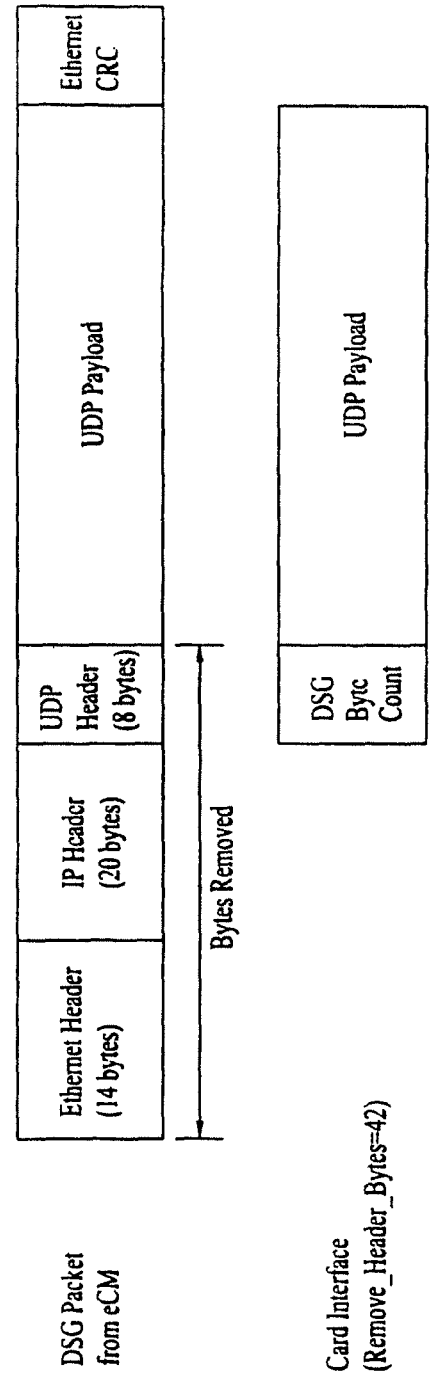

FIGS. 6A to 6C are schematic views showing an Ethernet frame packet and a DSG packet to which the Ethernet frame packet is transformed.

In the case where the network modem 200 is implemented by the DOCSIS modem, the existing cable broadcast may be received and the frame received by the DOCSIS modem should be transformed to the DSG packet in order to pass through the DSG flow. This is because the existing cable card operates in a state in which it is expected that only the DSG packets pass through the DSG flow and the corresponding packet does not enter the IP_U flow. The data passing through the DSG flow may include CA tunnel data and BT tunnel data. The CA tunnel data is transmitted via the CA tunnel and is constituted by data consumed by the security card in the data which will be transmitted from the headend to the security card. In contrast, the BT tunnel data is data transmitted via the BT tunnel and corresponds to the MPEG section data such as SI, EAS or XAIT. After the DSG packet is transmitted to the security card via the DSG flow, the security card extracts the MPEG section from the DSG packet, reassembles the fragmented MPEG section to configure a complete MPEG section, and transmits the complete MPEG section to the host device via the MPEG section flow.

A 2-byte DSG byte count is attached to a foremost portion of the DSG packet passing through the DSG flow. An Ethernet CRC is removed from the frame received by the DOCSIS modem if remove_header_bytes is 0, an Ethernet header, an IP header and the Ethernet CRC are removed from the frame received by the DOCSIS modem if the remove_header_bytes is 1, and the Ethernet header, the IP header, an UDP header and the Ethernet CRC are removed from the frame received by the DOCSIS modem if the remove_header_bytes is 42. Since the DSG packet passing through the DSG flow is not the IP packet, the security card malfunctions if the DSG packet is transmitted via the IP_U flow.

FIG. 7 is a schematic view showing the Ethernet frame packet and the IP packet to which the Ethernet frame packet is transformed in order to pass through the IP_U flow, according to an embodiment of the present invention.

In the case where the network modem 200 is implemented by the MoCA, the IP physical interface unit 214 can receive the frame packet, that is, the Ethernet frame, from the MoCA. The frame packet received via the IP physical interface unit 214 of FIG. 2 is transmitted to the routing engine 216. The IP physical interface unit 214 transmits the Ethernet frame packet to the routing engine 216 as shown in the upper side of FIG. 6.

The Ethernet frame packet includes a 14-byte Ethernet header, a 20-byte IP header, an 8-byte UDP header, and a UDP payload, and an Ethernet CRC. In the case where data is transmitted by the TCP protocol instead of the UDP protocol, a TCP header and a TCP payload are included instead of the UDP header and the UDP payload.

The routing engine 216 receives and routes the Ethernet frame packet to the destination address of the packet. At this time, if the above-described OOB message is received by the unicast method and routed to the security card, the message may be routed to the security card via the IP_U flow instead of the DSG flow.

As described above, the host device may route the OOB message to the security card using the second layer routing method, the third layer routing method or the fourth layer routing method. In the security card, a specific MAC address, an IP address and port number are previously set. In the second layer routing method, the data in which the destination MAC address included in the Ethernet header of the Ethernet frame is set to the MAC address of the security card is transmitted to the security card. In the third layer routing method, data in which the destination IP address included in the IP header of the Ethernet frame is set to the IP address of the security card is transmitted to the security card. In the third layer routing method, data in which the port number included in the UDP or TCP header of the Ethernet frame is set to a port number assigned to the security card is transmitted to the security card.

In the IP_U flow, the IP packet shown in the lower side of FIG. 6 is transmitted. The IP packet includes a 20-byte IP header, an 8-byte UDP header and a UDP payload. Similarly, in the case where the data is transmitted by the TCP protocol instead of the UDP protocol, the TCP header and the TCP payload are included instead of the UDP header and the UPD payload.

Accordingly, the IP packet data in which the Ethernet header and the Ethernet CRC are removed from the Ethernet frame packet is transmitted to the security card in all the second layer routing method, the third layer routing method and the fourth layer routing method. The IP packet may be divided into a broadcast data packet including the MPEG section and a CA data packet including the CA information, according to the types of the data.

Figure 8:
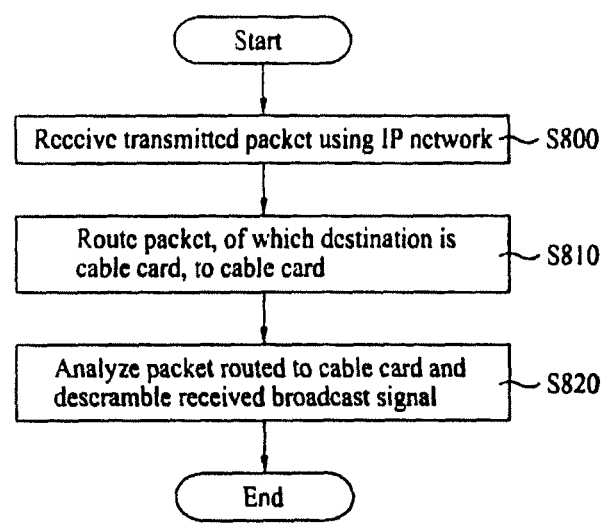
FIG. 8 is a flowchart illustrating a process of processing received data according to an embodiment of the present invention.

FIG. 8 is a flowchart illustrating a process of processing received information according to an embodiment of the present invention.

The host device of the receiver receives a packet transmitted using the IP network (S600). For example, the packet may be an IPTV broadcast packet according to the Internet protocol, a VOD packet or an OOB message packet including scramble information.

The host device of the broadcast receiver routes the received packet to a destination address. The packet, of which the destination is the security card, in the received packet is routed to the security packet (S610). An example of the packet of which the destination is the security card may include an OOB message packet including scramble information. In the case where the OOB message packet is received by the unicast method, the host device can transmit the data using the IP_U flow of the extended channel of the interface between the security card and the host device.

The security card analyzes the received data and acquires the scramble information. The security card descrambles the broadcast data and the A/V signal received by the host device using the scramble information and outputs the descrambled data to the screen (S620). Examples of the broadcast data and the A/V signal may include cable broadcast data, IPTV broadcast data or VOD image signal received in-band.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A host device interfacing with a point of deployment (POD), the host device comprising:
    an Internet Protocol (IP) physical interface unit configured to receive an Ethernet frame including broadcast data;
    a routing engine configured to extract an IP packet from the Ethernet frame providing a specified multicast IP address and forward the extracted IP packet over an extended channel to the POD;

an IP to TS decapsulator configured to receive the extracted IP packet and extract Moving Picture Experts Group-2 (MPEG-2) TS packets carried within the received IP packet and output the extracted MPEG-2 TS packets to a multiplexer;

a Broadband Interface unit configured to receive broadcast data through a cable;

a Demodulator configured to demodulate the received broadcast data;

the Multiplexer configured to multiplex the broadcast data and output the multiplexed broadcast data to the POD through an MPEG data flow; and a Demultiplexer configured to separate the multiplexed broadcast data, which is received from the POD, for routing.

2. The host device of claim 1, further comprising:
a routing engine route the IP packets to the decapsulator based upon a layer-3 routing method.

3. The host device of claim 2, wherein the multiplexer appends a packet header to the broadcast data prior to the multiplexing.

4. The host device of claim 3, further comprising:
a descrambler configured to decrypt CMPs encrypted by the POD and process the decrypted CMPs to be suitable for the demultiplexer.

5. The host device of claim 4, wherein the demultiplexer removes the packet header from the decrypted multiplexed broadcast data.

6. The host device of claim 5, further comprising:
a controller configured to determine an operational mode of the POD.

7. The host device of claim 6, wherein the operational mode of the POD is an IP mode processing the IP packets.

8. A method of processing broadcast data, the method comprising:

receiving an Ethernet frame including broadcast data through a network modem;

extracting an Internet Protocol (IP) datagram from the Ethernet frame providing a specified multicast IP address and forwarding the extracted IP packet over an extended channel to a point of deployment (POD);

receiving the extracted IP packet and extract Moving Picture Experts Group-2 (MPEG-2) TS packets carried within the received IP packet and outputting the extracted MPEG-2 TS packet;

receiving broadcast data through a cable;

demodulating the received broadcast data;

multiplexing the broadcast data and outputting the multiplexed broadcast data to the POD through an MPEG data flow; and separating the multiplexed broadcast data, which is received from the POD, for routing.

9. The method of claim 8, further comprising:
routing the IP packets based upon a layer-3 routing method.

10. The method of claim 9, further comprising:
appending a packet header to the broadcast data prior to the multiplexing.

11. The method of claim 10, further comprising:
decrypting CMPs encrypted by the POD and processing the decrypted CMPs.

12. The method of claim 11, further comprising:
removing the packet header from the decrypted CMPs.

13. The method of claim 12, further comprising:
determining an operational mode of the POD.

14. The method of claim 13, wherein the operational mode of the POD is an IP mode processing the IP packets.

* * * * *